United States Patent [19]

Krechel et al.

[11] Patent Number: 4,705,076

[45] Date of Patent: * Nov. 10, 1987

[54] MANIFOLD FITTING FOR A COMPRESSED AIR TANK

[75] Inventors: Joseph L. Krechel; Michael J. Purvis; Paul F. Ross, II, all of St. Louis, Mo.

[73] Assignee: Control Devices, Incorporated, St. Louis, Mo.

[*] Notice: The portion of the term of this patent subsequent to Oct. 14, 2003 has been disclaimed.

[21] Appl. No.: 906,389

[22] Filed: Sep. 12, 1986

[51] Int. Cl.[4] .......................................... F16K 11/10
[52] U.S. Cl. ............................. 137/883; 137/543.13; 137/881; 137/614.18; 137/614.19; 222/400.7
[58] Field of Search ................... 137/542, 543.13, 881, 137/883, 599.2, 614.18, 614.19; 222/400.7

[56] References Cited

U.S. PATENT DOCUMENTS

| | | | |
|---|---|---|---|
| 1,259,805 | 3/1918 | Tharp | 137/599.2 |
| 1,404,639 | 1/1922 | Phelps | 137/542 |
| 3,090,530 | 5/1963 | Peeps | 222/400.7 |
| 3,327,899 | 6/1967 | Reynolds et al. | 222/400.7 X |
| 3,334,697 | 8/1967 | Edwards et al. | 137/543.13 X |
| 4,574,836 | 3/1986 | Barnard, Jr. | 137/542 X |
| 4,616,677 | 10/1986 | Krechel et al. | 137/886 X |

Primary Examiner—A. Michael Chambers
Assistant Examiner—John C. Fox
Attorney, Agent, or Firm—Senniger, Powers, Leavitt and Roedel

[57] ABSTRACT

A manifold fitting for a compressed air tank comprising an elongate main body of hexagonal cross-section having an axial passage for communication with the tank, a first lateral opening extending from a first face of the body, an outlet member threaded in the first lateral opening having a valve seat at its inner end and a second lateral opening extending from a second face opposite the first. A valve member is threaded in the second lateral opening extending across the stem with an axial passage therein extending inwardly partway from its outer end to at least one port in the valve stem for communication with the axial passage. A filler check valve is located in the axial passage for filling the tank with compressed air via application of a coupling at the end of a compressed air supply to said stem. A third lateral opening extends inwardly from a third face to said passage and has a pressure relief safety valve therein. A fourth threaded lateral opening in the body extends inwardly from a fourth of the faces to the passage for receiving a pressure gauge.

4 Claims, 5 Drawing Figures

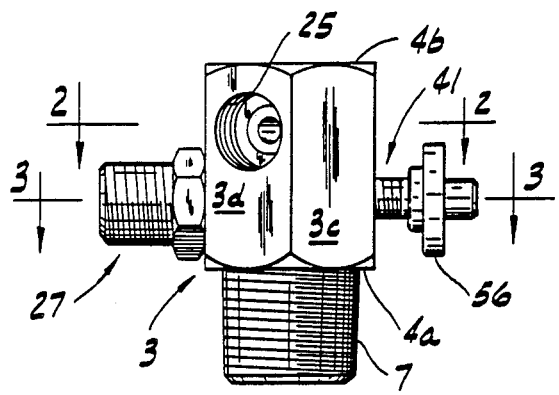
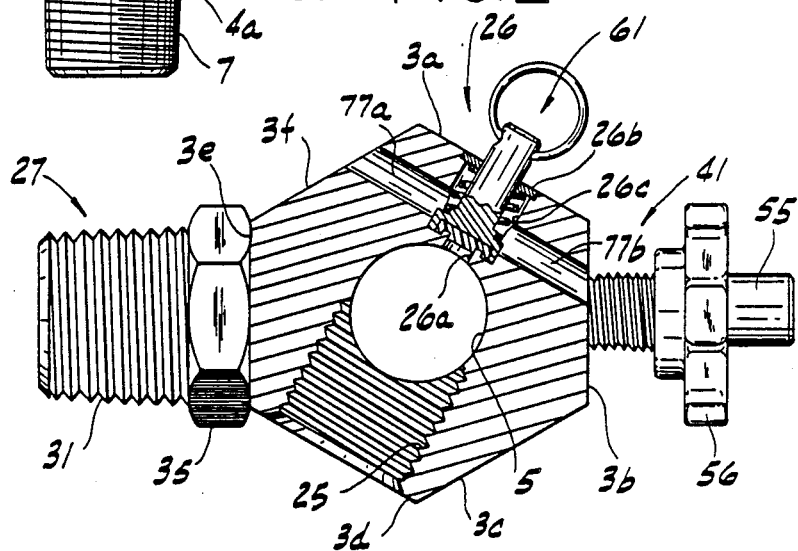
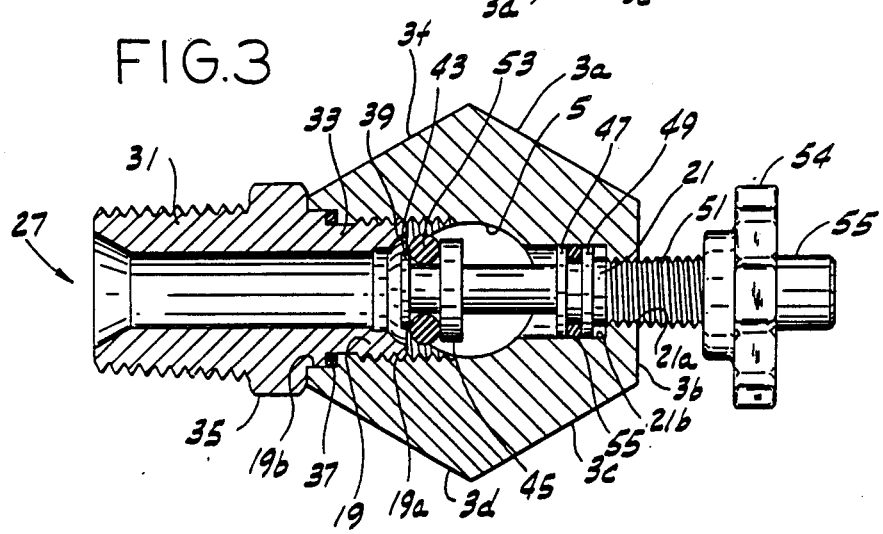

MANIFOLD FITTING FOR A COMPRESSED AIR TANK

BACKGROUND OF THE INVENTION

This invention relates to a manifold fitting, and more particularly to a manifold fitting for a compressed air tank.

The invention is in the same general field as the manifold assembly shown in U.S. Pat. No. 4,120,319 issued Oct. 17, 1978 and co-pending U.S. patent application Ser. No. 723,135, filed on Apr. 15, 1985, and involves improvements thereover.

SUMMARY OF THE INVENTION

Among the several objects of this invention may be noted the provision of a manifold fitting for a compressed air tank with components which can be easily interchanged; the provision of such a manifold fitting that has the flexibility of changing to various configurations; and the provision of such a manifold fitting which is simple in construction, inexpensive to manufacture, easy to install and reliable in operation.

In general, a manifold fitting of this invention is designed for a compressed air tank and comprises an elongate main body of hexagonal cross-section with first and second ends, the first end being of reduced circular cross-section. The main body has an axial passage extending from the first end toward and terminating short of the second end. The first end of the main body is externally threaded for attachment of the fitting to a tank for communication with the tank via the passage. The body also has a first lateral opening extending inwardly to the axial passage from a first face of six faces of the body. An outlet member is threaded in the first lateral opening in the body and has a valve seat at its inner end toward the passage. A second lateral opening in the body extends inwardly to the axial passage from a second of the six faces of the body opposite the first face. The second lateral opening is opposite the first lateral opening and is in axial alignment therewith. A valve member is threaded in the second lateral opening and extends across the passage with space around it for flow of air through the passage. The valve member is adapted to be threaded inwardly in the second lateral opening to a closed position in engagement with the valve seat and to be threaded outwardly with respect to the second lateral opening to an open position for flow of air from the tank through the passage and out through the outlet member. The valve member further has a stem with an axial passage therein which extends inwardly partway from its outer end to at least one port in the valve stem for communication with the axial passage in the main body. A filler check valve is situated within the axial passage in the stem for filling the tank with compressed air via application of a coupling at the end of a compressed air supply to the stem. A pressure relief safety valve is provided at a third lateral opening extending inwardly from a third of the six faces of the main body. The main body further has a fourth threaded lateral opening for a pressure gauge.

This invention is also directed to the process of providing a metal manifold with a pressure safety valve. In the process, the manifold has a face, an internal fluid passage, a lateral opening extending from the face inwardly to the internal fluid passage, a cross-passage intersecting the lateral opening, and a valve seat between the fluid passage and the intersection of the lateral opening and the cross-passage. The opening has a first diameter near the internal fluid passage and an enlarged diameter near the face providing a shoulder. The method comprises several steps. First, a valve member is inserted in the lateral opening. The valve member is movable toward and away from the valve seat. Next, a spring means is inserted for biasing the valve member against the valve seat. Then, a closure is inserted in the opening above and against the spring means and against the shoulder. Finally, the closure is secured against the shoulder.

This invention is further directed to a manifold having an axial passage therein and an opening in the manifold which intersects a cross-passage and extends to the axial passage. The manifold comprises a safety valve which comprises a closure at the outer end of the opening, a valve seat between said axial passage and the intersection of said opening and the cross-passage, a valve member slidable toward and away from the valve seat, and a spring means biasing the valve member against the valve seat.

Other objects and features will be in part apparent and in part pointed out hereinafter.

BRIEF DESCRIPTION OF THE DRAWINGS

FIG. 1 is a side elevation of a manifold fitting of this invention;

FIG. 2 is a transverse section on line 2—2 of FIG. 1;

FIG. 3 is a transverse section on line 3—3 of FIG. 1;

Corresponding reference characters indicate corresponding parts throughout the several views of the drawings.

DESCRIPTION OF THE PREFERRED EMBODIMENT

Figure 4:
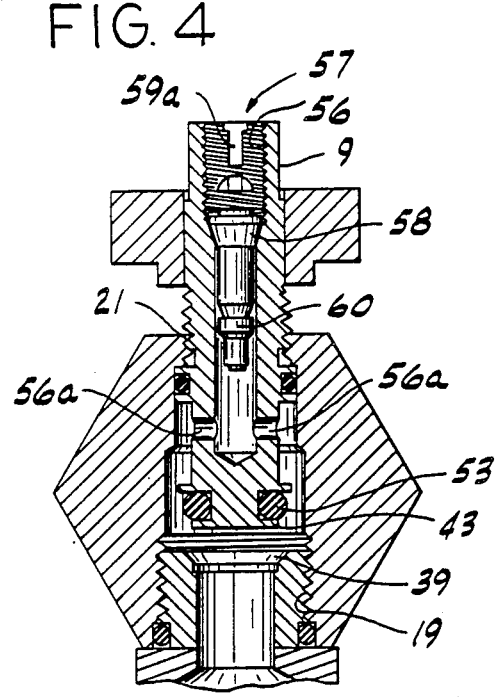
FIG. 4 is an enlarged vertical section on line 4—4 of FIG. 1 showing a filler valve.

Referring now to the drawings, a manifold fitting of this invention, generally designated 1, is shown to comprise an elongate main body 3 of hexagonal cross-section, its six faces being designated 3a, 3b, 3c, 3d, 3e and 3f, and its ends being designated 4a and 4b. The body has a longitudinal passage 5 extending partway therethrough from end 4a toward end 4b, being of generally circular cross-section as shown in FIG. 2. Body 3 has an externally threaded first end portion 7 at the end 4b of the passage for attachment of the fitting 1 to a tank (not shown) for communication with the tank.

The main body 3 further has threaded lateral openings 19, 21 and 25 therein, and one unthreaded opening 26 therein. The first lateral opening 19, which is an outlet opening, is in face 3e of the main body and has a threaded inner portion 19a and an unthreaded outer end counterbore 19b of slightly larger diameter than the inner portion 19a. The second lateral opening 21 is in face 3b opposite face 3e and in axial alignment with the outlet opening 19. The second opening 21 has a threaded outer portion 21a and an unthreaded inner end counterbore 21b of greater diameter than the outer portion 21a but of smaller diameter than portion 19a of opening 19. The third lateral opening 25 is in face 3d of the main body, of uniform diameter and threaded. The fourth lateral opening 26 is in face 3a and has an unthreaded inner end portion 26a, an unthreaded outer end counterbore 26b of greater diameter than the inner portion 26a, and an unthreaded intermediate portion 26c of diameter greater than the inner portion 26a and smaller than the outer end counterbore 26b. Face 3a is crimped about opening 26 so as to lessen the diameter of outer end counterbore 26b where it meets face 3a. The location of the openings along the body 3 is not crucial to the operation of this invention except that the outlet opening 19 and the second lateral opening 21 must be in axial alignment with each other.

An outlet member 27 illustrated as being a nipple comprising a tubular body with a passage 29 therethrough, outer and inner threaded portions 31 and 33 and a hexagonal head 35 therebetween is adapted to be threaded in the first lateral opening 19 with the inner portion 33 in communication with passage 5. The diameter of the outer portion 31 of the outlet nipple 27 is greater than that of the inner end portion 33, and the outer portion 31 is adapted to threadably receive an air line for the flow of compressed air from the tank, through passages 5 and 29, and into the line. An O-ring seal 37 is provided on the inner portion of the nipple 27 adjacent its hexagonal head 35 to seal the outlet opening 19 at the junction of its inner and outer portions 19a and 19b when the outlet nipple 27 is threaded therein. The hexagonal head 35 is adapted to receive a suitable tool for tightening the outlet nipple in the opening 19.

The outlet nipple 27 has a valve seat 39 at its inner end. A valve member 41 cooperable with the seat 39 is threadably fitted in the second lateral opening 21. It comprises a cylindrical stem with first and second rings 43 and 45 at the inner end thereof, third and fourth rings 47 and 49 intermediate its ends and a threaded outer end portion 51. An O-ring seal 53 disposed between the first and second rings 43 and 45 is adapted to engage the valve seat at the inner end of the outlet nipple 27 to block the passage of air through the outlet nipple, ring 43 being of smaller diameter than ring 45. A second O-ring seal 55 between the third and fourt rings 47 and 49 provides a slidable seal in the inner portion 21b of the second opening 21. The valve member 41 is threaded from the inside to the outside in the second lateral opening 21 and extends across the passage 5 with space therearound for the flow of air (see FIG. 3). The valve member 41 is adapted to be threaded inwardly in the second lateral opening 21 for engagement of the O-ring seal 53 with the valve seat 39 and outwardly with respect to the second lateral opening 21 to an open position for the flow of air from the tank through the passage 5 and through the outlet nipple passage 29. A knob 54 is attached to unthreaded portion 55 of the end of outer end portion 51 of valve member 41 for turning the member for inward and outward movement.

Figure 5:
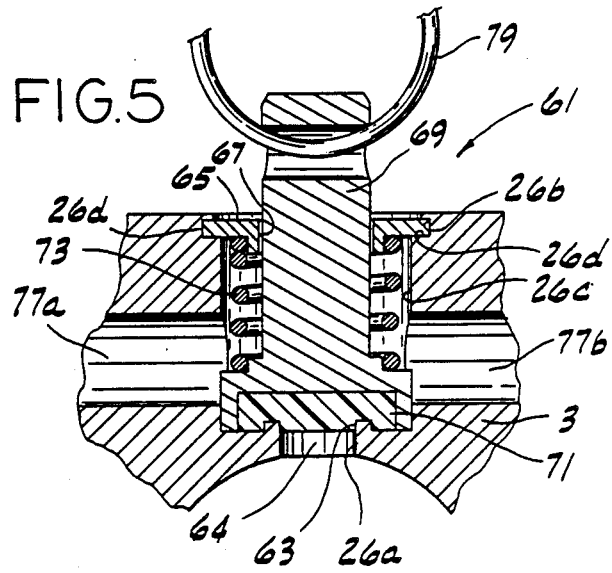
FIG. 5 is a view illustrating a second embodiment of the invention.

Valve member 41 further comprises a stem passage 56 extending inwardly partway therethrough along its major axis from its outer end. Vents 56a, in valve member 41 allow air passage between stem passage 56 and axial passage 5 of main body 3. Filler check valve 57 is threaded in passage 56 for filling the tank with compressed air via application of a coupling at the end of a compressed air supply line (not shown). The check valve 57, as shown in FIG. 5, is of the conventional well-known type used for inflating tires, having a tubular body 58, a stem 59 therethrough and a spring (not shown) therein. The stem 59 has a valve member 60 for blocking the inner end of the body 58 and is held against the opening by the spring. Air is permitted to pass through the body and passage 56 of the valve member 41 by pressing inwardly on the outer portion 59a of the stem, thereby moving the valve member 60 away from the inner opening of the body and unblocking the passage through the check valve's body 58.

A pressure relief safety valve 61 is incorporated within the lateral opening 26 in the main body 3. Opening 26 has an unthreaded inner end portion 26a, an unthreaded outer end counterbore 26b of slightly greater diameter than the inner portion 26a, and an unthreaded intermediate portion 26c of diameter greater than the inner portion 26a and smaller than the outer end counterbore 26b. Outwardly facing shoulder 26d is thereby formed between counterbore 26b and intermediate portion 26c. Inner portion 26a is formed to provide a valve seat 63 and having a passage 64 through said inner end portion (and seat) for flow of air to the intermediate portion 26c of valve 61. A closure head 65 is situated in the outer end counterbore 26b against shoulder 26d and held in place by a portion of metal of face 3a swaged about the periphery of opening 26 so as to lessen the diameter of outer end counterbore 26b where it meets face 3a. The closure head has a central opening 67. A stem 69 slidable in opening 67 has a valve member 71 at its inner end within the valve 61 engageable with the seat 63. Spring means 73 interposed between the valve member 71 and the closure 65 and biases the valve member 71 to its closed position engaging the seat. A cross passage through the manifold body 3 intersects opening 26 to form two lateral ports 77a, 77b extending through manifold body 3 in alignment with each other for the escape of air. Air is vented from the tank through ports 77a and 77b when the force of air on the valve head 71 exceeds the opening bias or on manually pulling the stem 69 by means of a ring 79 at the outer end of the stem 69.

The main body further has the threaded lateral opening 25 adapted to receive a pressure gauge (not shown) for determining the pressure in the compressed air tank.

A significant advantage of the manifold fitting of this invention is its flexibility so far as the manufacturer is concerned for supplying it in different configurations to suit users' different requirements. Thus, for example, the manufacturer may supply the fitting with an outlet member at 27 having a female thread instead of the male thread at 31, the outlet member being threaded in the opening 19 and having a valve seat the same as at 39.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A manifold fitting for a compressed air tank comprising:
   an elongate main body of hexagonal cross-section with first and second ends, the first end being of reduced circular cross-section;
   said body having an axial passage extending from the first end toward and terminating short of the second end;
   said first end being externally threaded for attachment of the fitting to a tank for communication with the tank via the passage;

said body having a first lateral opening extending inwardly to said axial passage from a first face of the six faces of the body;

an outlet member threaded in said first lateral opening in the body having a valve seat at its inner end toward said passage;

said body having a second lateral opening extending inwardly to said passage from a second of the six faces of the body opposite said first face, said second lateral opening being opposite said first lateral opening and in axial alignment therewith;

a valve member threaded in said second lateral opening extending across said passage with space around said valve member for flow of air, said valve member being adapted to be threaded inwardly in said second lateral opening to a closed position in engagement with the valve seat and to be threaded outwardly with respect to said second lateral opening to an open position for flow of air from the tank through said passage and out through said outlet member, said valve member having a stem with an axial stem passage therein extending inwardly partway from its outer end to at least one port in the valve stem for communication with the axial passage in the main body;

a filler check valve in the axial stem passage of said valve member for filling the tank with compressed air via application of a coupling at the end of a compressed air supply to said stem;

said body having a third lateral opening extending inwardly from a third of said six faces to said passage;

a pressure relief safety valve at said third lateral opening in the body; and said body having a fourth threaded lateral opening extending inwardly from a fourth of said faces to said passage for receiving a pressure gauge.

2. A manifold as set forth in claim 1 wherein said body has a cross passage intersecting said third lateral opening and wherein said safety valve comprises a closure at the outer end of said third lateral opening, a valve seat between said axial passage and the intersection of said third lateral opening and said cross passage, a valve member movable toward and away from said safety valve seat, and spring means biasing said safety valve member against the safety valve seat.

3. A manifold as set forth in claim 2 wherein the outer end of said third lateral opening is of enlarged diameter so as to form an outwardly-facing shoulder in said opening, and wherein the closure is secured against the shoulder in the outer portion of said third lateral opening by a swaged-over portion of the body at the outer end of said third lateral opening.

4. A manifold as set forth in claim 3 wherein an intermediate portion of said third lateral opening is of enlarged diameter with respect to an inner portion of said third lateral opening and the outer end of said third lateral opening is of further enlarged diameter so as to form said outwardly-facing shoulder between the intermediate portion and the outer portion.

* * * * *